US012136398B2

(12) United States Patent
Furihata et al.

(10) Patent No.: US 12,136,398 B2
(45) Date of Patent: Nov. 5, 2024

(54) BACKLIGHT CONTROL FOR DISPLAY DEVICES

(71) Applicant: Synaptics Incorporated, San Jose, CA (US)

(72) Inventors: Hirobumi Furihata, Tokyo (JP); Kazutoshi Aogaki, Kanagawa (JP); Takashi Nose, Kanagawa (JP); Masao Orio, Tokyo (JP); Tomoo Minaki, Tokyo (JP); Akio Sugiyama, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 138 days.

(21) Appl. No.: 17/877,659

(22) Filed: Jul. 29, 2022

(65) Prior Publication Data

US 2024/0038183 A1 Feb. 1, 2024

(51) Int. Cl.
*G09G 3/34* (2006.01)

(52) U.S. Cl.
CPC ....... *G09G 3/3426* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 11,281,047 B1 * | 3/2022 | Dunn | .................... | G09G 3/3426 |
| 11,776,489 B2 * | 10/2023 | Maekawa | ............ | G09G 3/2096 345/102 |
| 2016/0225323 A1 * | 8/2016 | Lu | ......................... | G09G 3/3406 |
| 2019/0353961 A1 * | 11/2019 | Ji | .......................... | G09G 3/3426 |

* cited by examiner

*Primary Examiner* — Matthew Yeung
(74) *Attorney, Agent, or Firm* — Leydig, Voit & Mayer, Ltd.

(57) ABSTRACT

A display device includes a display panel, a backlight module, and backlight control circuitry. The backlight module is configured to illuminate the display panel, the backlight module comprising a plurality of light sources. The backlight control circuitry is configured to control first luminance of a first light source of the plurality of light sources based at least in part on a first weighted average of brightness values for a first set of pixels of the display panel.

18 Claims, 14 Drawing Sheets

BACKLIGHT CONTROL FOR DISPLAY DEVICES

FIELD

The disclosed technology generally relates to backlight control for display devices.

BACKGROUND

Display devices with light-transmissive display panels, such as light-transmissive liquid crystal display (LCD) panels, incorporate backlights that illuminate the light-transmissive display panels. One modern backlighting technique is direct-lit backlighting. A display device adapted to direct-lit backlighting may include an array of light sources (such as light emitting diodes (LEDs)) configured to illuminate corresponding regions or areas of the display panel. The direct-lit backlighting facilitates local dimming, which may provide brighter or darker portions on the display image to enhance the image quality.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In general, in one aspect, one or more embodiments relate a display device that includes a display panel, a backlight module, and backlight control circuitry. The backlight module is configured to illuminate the display panel. The backlight module includes a plurality of light sources. The backlight control circuitry is configured to control first luminance of a first light source of the plurality of light sources based at least in part on a first weighted average of brightness values for a first set of pixels of the display panel.

In general, in one aspect, one or more embodiments relate a display driver that includes drive circuitry and backlight control circuitry. The drive circuitry is configured to drive, based at least in part on image data, a display panel illuminated by a backlight module comprising a plurality of light sources. The backlight control circuitry is configured to control first luminance of a first light source of the plurality of light sources based at least in part on a first weighted average of brightness values for a first set of pixels of the display panel.

In general, in one aspect, one or more embodiments relate a method for controlling a backlight module is provided. The method includes illuminating a display panel with a backlight comprising a plurality of light sources. The method further includes controlling first luminance of a first light source of the plurality of light sources based at least in part on a first weighted average of brightness values for a first set of pixels of the display panel.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
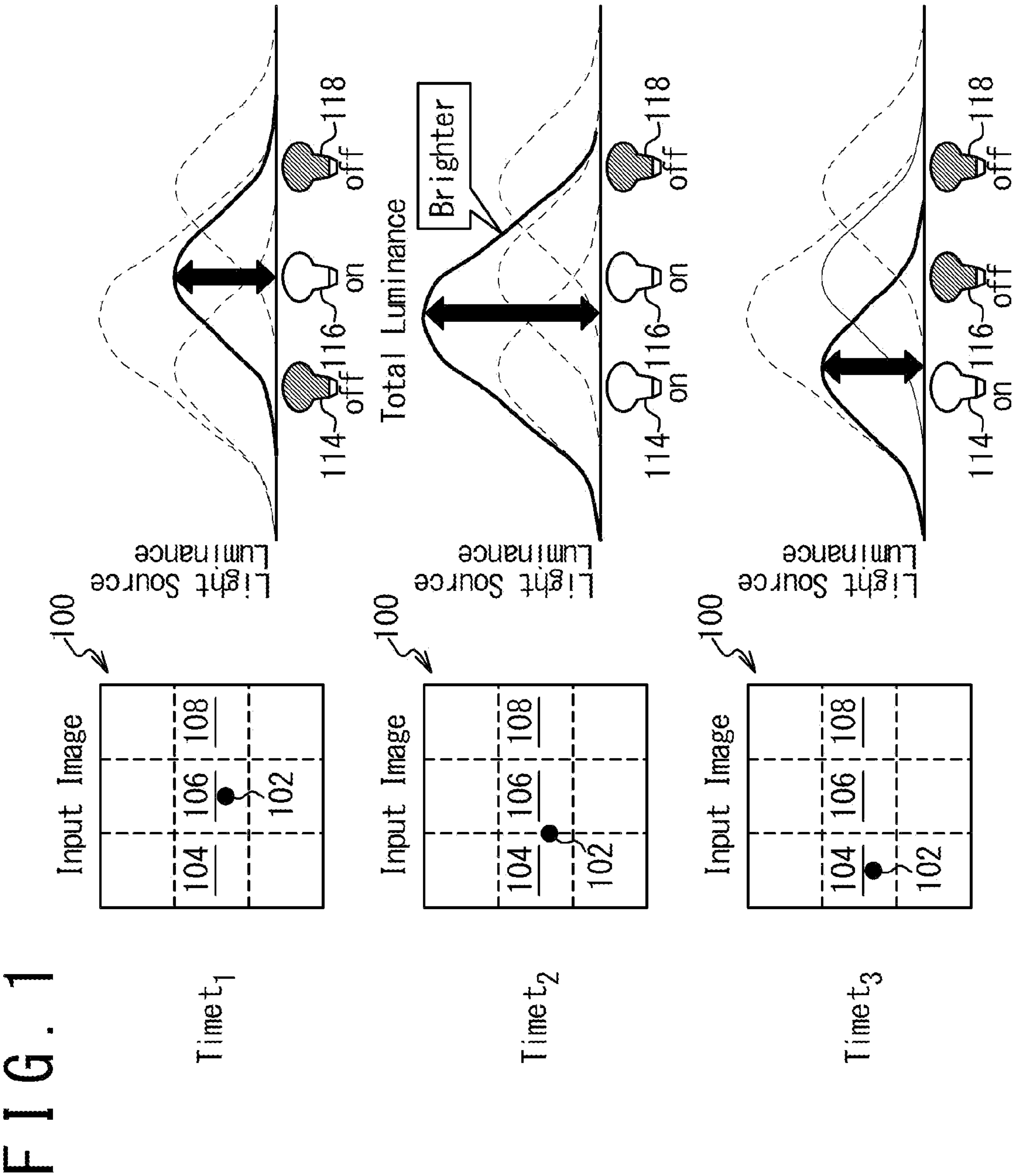
FIGS. 1 and 2 show examples of undesired backlight control that may cause image quality deterioration.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure provides devices and methods for backlight control for display devices that use multiple light sources (e.g., LEDs) to illuminate a display panel (e.g., an LCD panel or other light-transmissive display panels). In direct-lit implementations, an array of light sources may be located behind a display panel to illuminate corresponding regions or areas of the display panel. The luminance of each light source may be individually controlled to achieve local dimming, which provides brighter portions and darker portions of the display image to enhance the image contrast.

Figure 2:
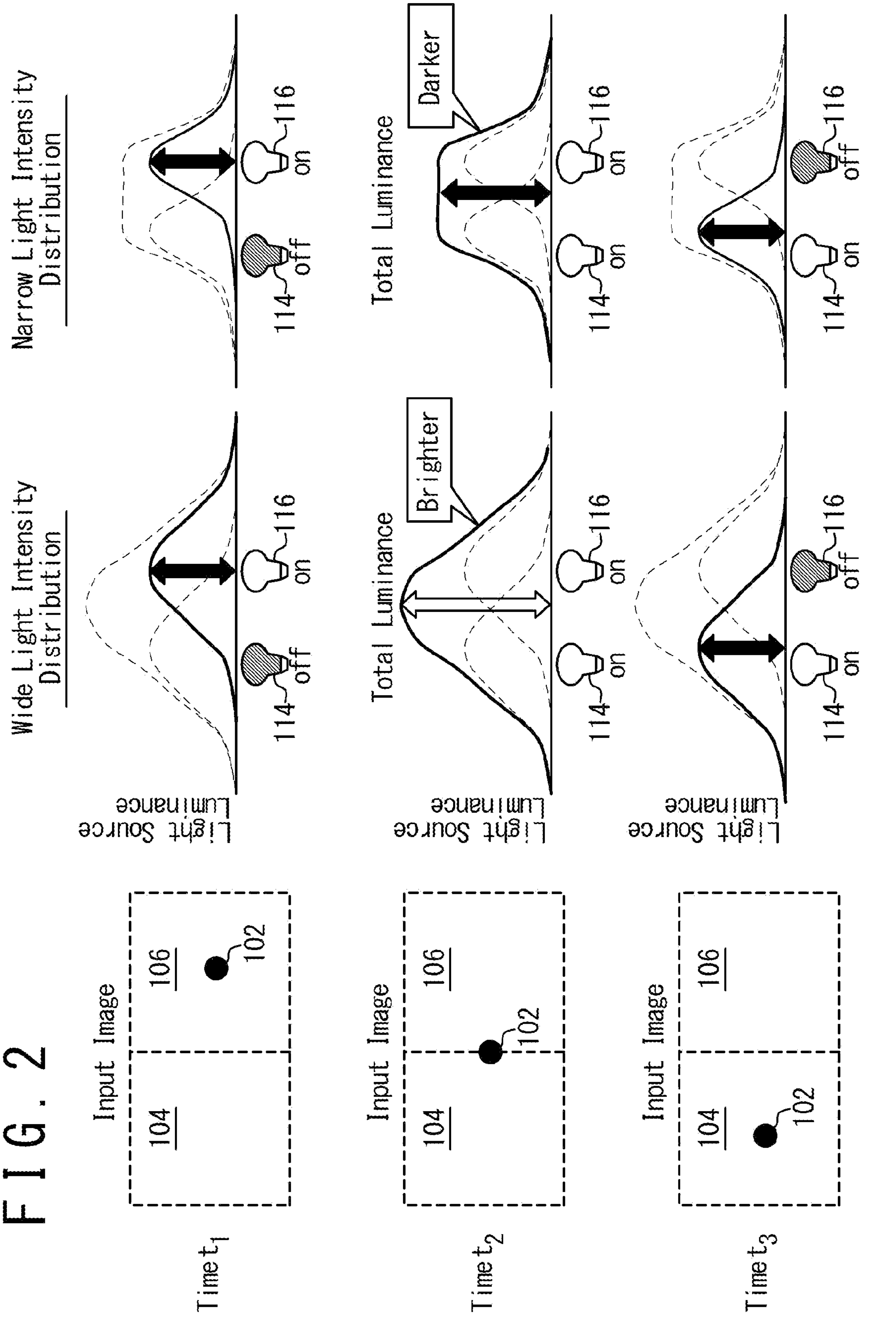

Improper control of the luminance of the light sources may however cause flicker, artifacts or other undesired effects on the display image. FIGS. 1 and 2 show examples of undesired backlight control that may cause image quality deterioration. In the example shown in FIG. 1, a display panel 100 is sectioned into square regions respectively illuminated with light sources (e.g., LEDs). In FIG. 1, successive three square regions 104, 106, and 108 are respectively illuminated with successive three light sources 114, 116, and 118 disposed behind the regions 104, 106, and 108. It is noted that each light source may be configured to partially illuminate nearby regions as well as the region behind which each light is disposed. The light sources 114, 116, and 118 may be configured to illuminate the regions 104, 106, and 108, respectively, based on the maximum brightness value of pixels in the regions 104, 106, and 108. This scheme may however cause flicker or an undesired change in the display image luminance.

FIG. 1 shows example changes in the total luminance of the display image in the case where a moving image is displayed in which an object 102 with the maximum luminance (shown as a black solid circle in FIG. 1) moves from inside of the region 106 to inside the region 104 in the background image of the lowest luminance (shown as a white square in FIG. 1). The top display panel and graph of FIG. 1 are at time $t_1$, the middle display panel and graph are at time $t_2$ that follows time $t_1$, and the bottom display panel and graph are at time $t_3$ that follows time $t_2$.

In this example, only the light source 116 emits light when the entirety of the object 102 is located in the region 106 (e.g., at time $t_1$) and only the light source 114 emits light when the entirety of the object 102 is located in the region 104 (e.g., at time $t_3$). While the object 102 is crossing the boundary between the region 104 and the region 106 (e.g., at time $t_2$), both the light sources 114 and 116 emit lights, and therefore the total luminance of the display image may increase. The increase in the total luminance may be observed as flicker by the user.

Turning to FIG. 2, the change in the total luminance may depend on the light intensity distributions of the light sources 114 and 116. As referred to herein, the light intensity distribution of a light source is the distribution of the intensity of light emitted from the light source. As shown in FIG. 2, wider light intensity distributions of the light sources 114 and 116 may cause a larger increase in the total luminance than narrower light intensity distributions of the light sources 114 and 116 when the object 102 crosses the boundary between the region 104 and the region 106.

Accordingly, for mitigating flicker, artifacts or other undesired effects, it would be desirable that the backlight control is based on the light intensity distributions of respective light sources. Described in the following are various embodiments which achieve improved backlight control for mitigating flicker, artifacts or other undesired effects. Some of disclosed embodiments provide backlight control based on light intensity distributions of the respective light sources.

Figure 3:
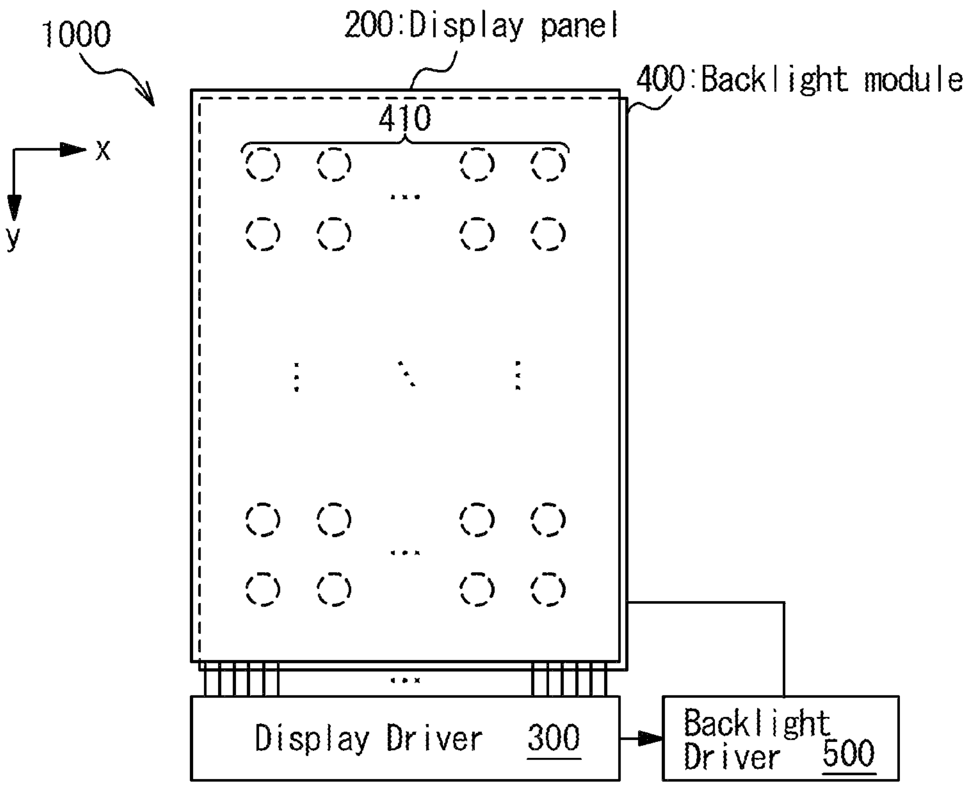
FIG. 3 shows an example configuration of a display device, according to one or more embodiments.

FIG. 3 shows an example configuration of a display device 1000, according to one or more embodiments. In the shown embodiment, the display device 1000 includes a display panel 200 and is configured to display desired images on the display panel 200. The display panel 200 may be a light-transmissive display panel, such as an LCD panel. In FIG. 3, the x axis is defined in the horizontal direction of the display panel 200, and the y axis is defined in the vertical direction of the display panel 200.

Figure 4:
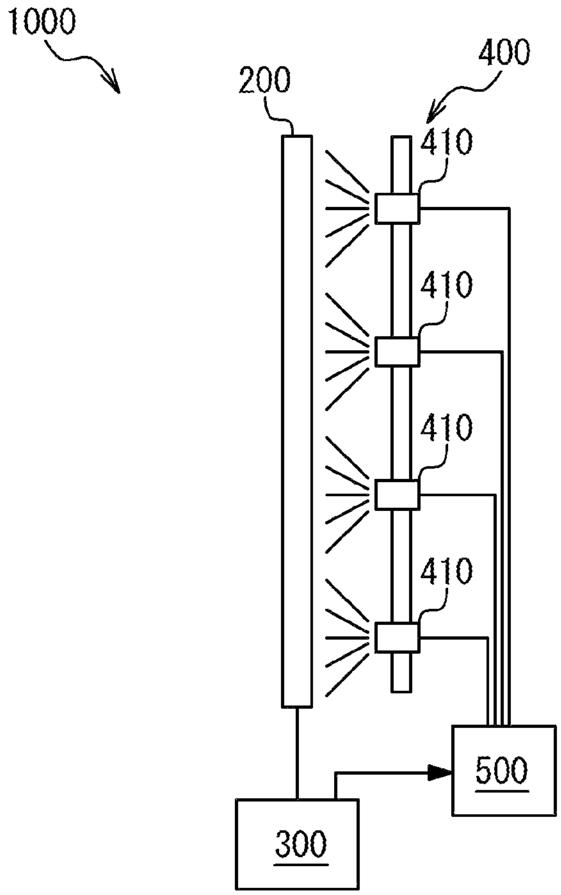
FIG. 4 shows an example side view of the display device shown in FIG. 3, according to one or more embodiments.

The display device 1000 further includes a display driver 300, a backlight module 400, and a backlight driver 500. The display driver 300 is configured to drive the display panel 200 to display a desired image on the display panel 200. The backlight module 400 is configured to illuminate the display panel 200. The backlight module 400 includes a plurality of light sources 410 which are shown in phantom in FIG. 3. While FIG. 3 shows 16 light sources 410, a skilled person would appreciate that the backlight module 400 may include more or less than 16 light sources 410. In one implementation, each light source 410 may include an LED or other directional light sources. In the shown embodiment, the light sources 410 are arranged in an array or matrix. In other embodiments, the light sources 410 may be arranged in an irregular or regular pattern. As shown in FIG. 4, the light sources 410 are located behind the display panel 200 and configured to illuminate corresponding portions of the display panel 200. It is noted that the portion of the display panel 200 illuminated by one light source 410 may partially overlap the portion of the display panel 200 illuminated by a different light source 410. While FIG. 4 shows four light sources 410, a skilled person would appreciate that the backlight module 400 may include more than four light sources 410. The backlight module 400 is coupled to the backlight driver 500. The backlight driver 500 is configured to drive the light sources 410 of the backlight module 400 under the control of the display driver 300 so that each light source 410 emits light with luminance specified by the display driver 300.

Figure 5:
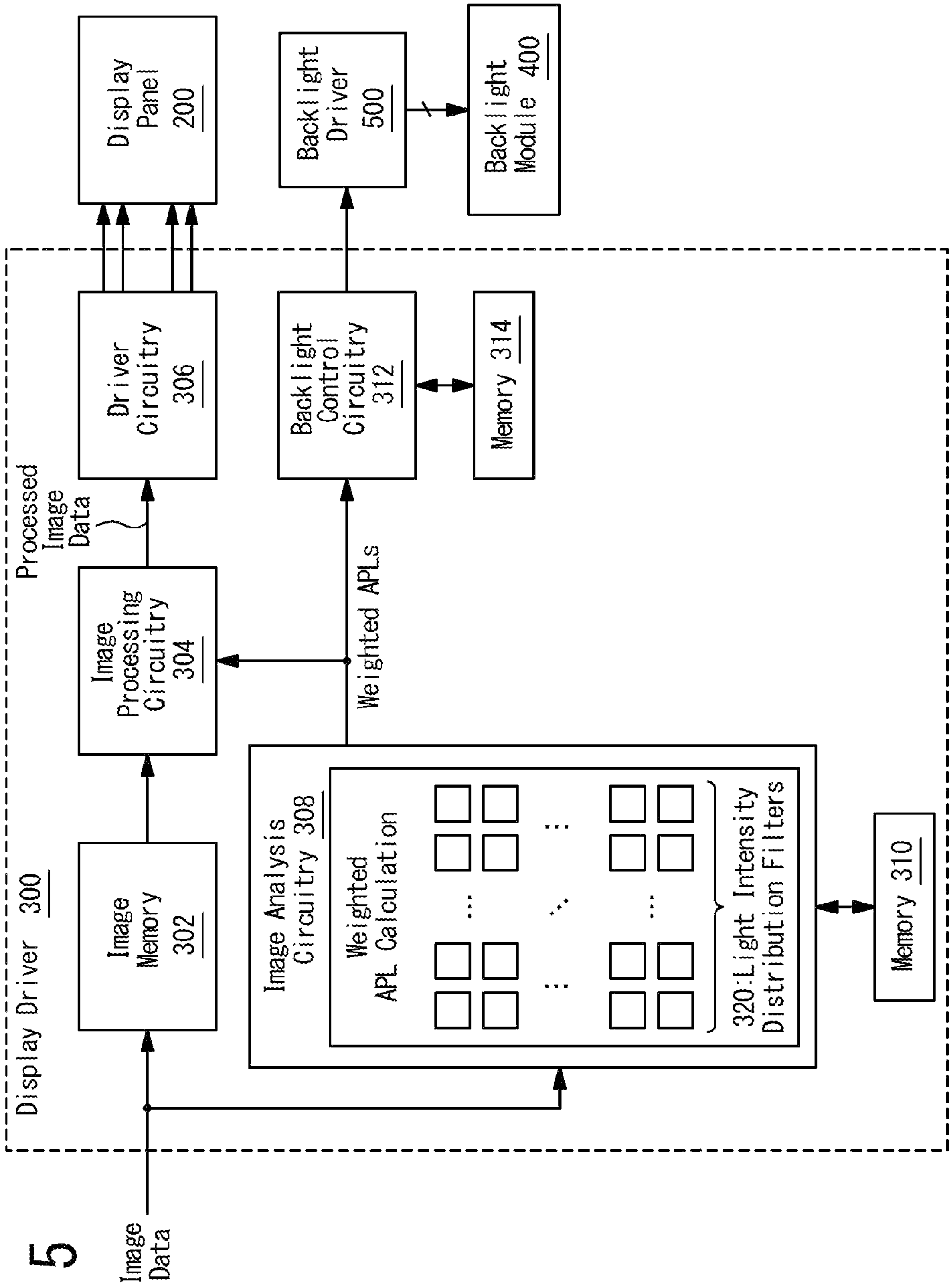
FIG. 5 shows an example configuration of a display driver, according to one or more embodiments.

FIG. 5 shows an example configuration of the display driver 300, according to one or more embodiments. In the shown embodiment, the display driver 300 includes an image memory 302, image processing circuitry 304, driver circuitry 306, image analysis circuitry 308, a memory 310, backlight control circuitry 312, and a memory 314. In one implementation, the memories 310 and/or 314 may be a random access memory (RAM). A different type of memory may be used for the memories 310 and/or 314.

The image memory 302 is configured to receive image data from an external source (not shown) and store therein the received image data. Examples of the external source include an application processor, a host, a central processing unit (CPU), or other processors configured to provide the image data to the display driver 300. The image data correspond to an image to be displayed on the display panel 200. The image data include pixel data for respective pixels disposed on the display panel 200. In one implementation, pixel data for each pixel may include greylevels of respective primitive colors (e.g., red (R), green (G), and blue (B)). In one implementation, each pixel of the display panel 200 may include R, G, and B subpixels configured to display red, green, and blue colors, respectively, and pixel data for each pixel may include R, G, and B greylevels that specify luminance of the R, G, and B subpixels, respectively.

The image processing circuitry 304 is configured to apply image processing to the image data retrieved from the image memory 302 to generate processed image data. The image processing performed by the image processing circuitry 304 may include color adjustment, demura correction, deburn correction, image scaling, gamma transformation, or other image processes.

The driver circuitry 306 is configured to receive the processed image data from the image processing circuitry 304 and drive respective pixels disposed in the display panel 200 based at least in part on the processed image data. In one implementation, each pixel in the display panel 200 may include R, G, and B subpixels and the processed image data may specify the luminance levels of the R, G, and B subpixels of each pixel. The driver circuitry 306 may be configured to program the R, G, and B subpixels of each pixel based at least in part on the processed image data to control the luminance levels of the R, G, and B subpixels as specified by the processed image data.

The image analysis circuitry 308 and the backlight control circuitry 312 are collectively configured to generate and provide a backlight control signal to the backlight driver 500 based at least in part on the image data to control the luminance of the respective light sources 410 (shown in FIGS. 3 and 4) of the backlight module 400. In one or more embodiments, the image analysis circuitry 308 is configured to calculate a weighted average picture level (APL) for each light source 410 based on the image data, and the backlight control circuitry 312 is configured to control the luminance of each light source 410 based at least in part on the weighted APL calculated for each light source 410. In the following, a detailed description is given of the calculation of the weighted APL for each light source 410 and the luminance control of each light source 410 based on the weighted APL.

In one or more embodiments, the weighted APL for a light source 410 is defined as a weighted average of brightness values of a set of pixels selected from the pixels of the display panel 200 for the light source 410. The set of pixels selected for the calculation of the weighted APL for a light source 410 of interest may include some but not all of the pixels of the display panel 200 located near the light source 410. The selection of the set of pixels may depend on the light sources 410. In one implementation, a first set of pixels may be selected for the calculation of the weighted APL for a first one of the light sources 410 and a second set of pixels may be selected for the calculation of the weighted APL for a second one of the light sources 410. The weighted APL for the first one of the light sources 410 may be calculated based on a weighted average of the brightness values of the first set of pixels, and the weighted APL for the second one of the light sources 410 may be calculated based on a weighted average of the brightness values of the second set of pixels. It is noted that one or more pixels may belong to both the first set of pixels and the second set of pixels. This may occur, for example, when the first one of the light sources 410 is located adjacent to or close to the second one of the light sources 410. Commonly using brightness values of one or more pixels located between adjacent two light sources 410 for the calculations of the weighted APLs for the two light sources 410 may suppress abrupt changes in the luminance of the two light sources 410 when an object moves between the two light sources 410 in a moving image displayed on the display panel 200.

The image analysis circuitry 308 may be configured to determine or calculate the brightness value for each pixel based on pixel data for each pixel included in the image data. In some embodiments, pixel data for each pixel may include R, G, and B greylevels, and the image analysis circuitry 308 may be configured to determine a brightness value for each pixel based on the R, G, and B greylevels. In one implementation, the image analysis circuitry 308 may be configured to determine a brightness value for each pixel as the "value" defined in the HSV color model, where "HSV" stands for "hue", "saturation", and "value". In this case, the image analysis circuitry 308 may be configured to determine a brightness value for each pixel as the largest one of the R, G, and B greylevels for each pixel. Alternatively, the image analysis circuitry 308 may be configured to determine a brightness value for each pixel in a different manner. For example, the determination of the brightness value for each pixel may be based on the YUV color model, which defines one luminance component Y and two chrominance components U (blue projection) and V (red projection). In such embodiments, the image analysis circuitry 308 may be configured to calculate a brightness value for each pixel as the luminance Y defined in the YUV color model based on the R, G, and B greylevels for each pixel.

The image analysis circuitry 308 is configured to calculate the weighted APL for each light source 410 based on weights assigned to a set of pixels selected for each light source 410. In one implementation, the weighted APL calculated for light source #i (i.e., a light source 410 of interest) may be calculated in accordance with the following equation (1):

$$Q_i = \sum_k w_k \cdot V_k \tag{1}$$

Where $Q_i$ is the weighted APL calculated for light source #i, Σ indicates the sum for the set of pixels selected for light source #i, $V_k$ is the brightness value for pixel k of the set of pixels selected for light source #i, and $w_k$ is the weight assigned to pixel k. As described above, in some implementations, the value for pixel k defined in the HSV color model may be used as $V_k$ in equation (1). The weights assigned to the respective pixels selected for each light source 410 may be predefined and the image analysis circuitry 308 may be configured to store therein the predefined weights assigned to the pixels selected for each light source 410.

In various embodiments, the weights assigned to the set of pixels selected for each light source 410 may depend on the respective distances between each light source 410 and the corresponding ones of the set of pixels. In one or more embodiments, the weights assigned to the set of pixels selected for each light source 410 may increase with decrease in the respective distances between each light source 410 and the corresponding ones of the set of pixels. In some embodiments, a first weight is assigned to a first pixel of a set of pixels selected for a light source 410 of interest, and a second weight is assigned to a second pixel of the set of pixels, where the distance between the first pixel and the light source 410 of interest is greater than the distance between the second pixel and the light source 410 of interest. In such embodiments, the first weight assigned to the first pixel is less than the second weight assigned to the second pixel.

Further, the weights assigned to the set of pixels for each light source 410 may be defined based on the light intensity distribution of each light source 410. In some embodiments, the weights assigned to the respective pixels selected for a light source 410 of interest may be based on the respective of light flux densities of light emitted from the light source 410 of interest at the positions of the respective pixels. In one implementation, the weights assigned to the respective pixels selected for the light source 410 of interest increase with increase in the light flux densities at the positions of the respective pixels.

In some embodiments, the image analysis circuitry 308 may include light intensity distribution filters 320 defined for the respective light sources 410. The light intensity distribution filter 320 defined for a light source 410 is a filter used to calculate the weighted APL for the light source 410 from the image data. The light intensity distribution filter 320 defined for a light source 410 may include filter coefficients defined for the respective pixels of the display panel 200. The filter coefficients of the light intensity distribution filter 320 defined for a light source 410 may be determined based on the light intensity distribution of the light source 410. The image analysis circuitry 308 may be configured to calculate the weighted APL for a light source 410 by applying the corresponding light intensity distribution filter 320 to the image data. In one implementation, the filter coefficients of the light intensity distribution filter 320 for the set of pixels selected for the calculation of the weighted APL for the corresponding light source 410 may be the weights assigned to the set of pixels, while the filter coefficients of the light intensity distribution filter 320 for other pixels may be zero. In some embodiments, the filter coefficients of the light intensity distribution filters 320 may be stored in the memory 310 and the image analysis circuitry 308 may be configured to retrieve the filter coefficients of the light intensity distribution filters 320 from the memory 310. The memory 310 may be also used as a work memory for the calculation of the weighted APLs for the respective light sources 410.

The weighted APLs thus calculated for the respective light sources 410 are provided to the backlight control circuitry 312. In some embodiments, the calculated weighted APLs may be further provided to the image processing circuitry 304. The image processing circuitry 304 may be configured to apply an image process (e.g., gamma transformation) based on the weighted APLs.

The backlight control circuitry 312 is configured to control the luminance of the respective light sources 410 based at least in part on the weighted APLs received from the image analysis circuitry 308. More specifically, the backlight control circuitry 312 is configured to specify or determine the luminance of the respective light sources 410 based on the weighted APLs calculated for the respective light sources 410. The backlight control circuitry 312 may be further configured to store the specified or determined luminance of the respective light sources 410 in the memory 314. In some embodiments, the backlight control circuitry 312 is configured to specify the luminance for each light source 410 such that the specified luminance for each light source 410 increases with increase in the corresponding weighted APL calculated for each light source 410. The backlight control circuitry 312 is further configured to notify the specified luminance of the respective light sources 410 to the backlight driver 500 by using the backlight control signal. The backlight driver 500 is configured to drive the respective light sources 410 with the luminance specified by the backlight control circuitry 312. For easy understanding, the luminance of each light source 410 may be hereinafter measured as a percentage from 0% to 100%. It is noted that a differently-defined value may be used to specify the luminance of each light source 410 in actual implementations.

Figure 6:
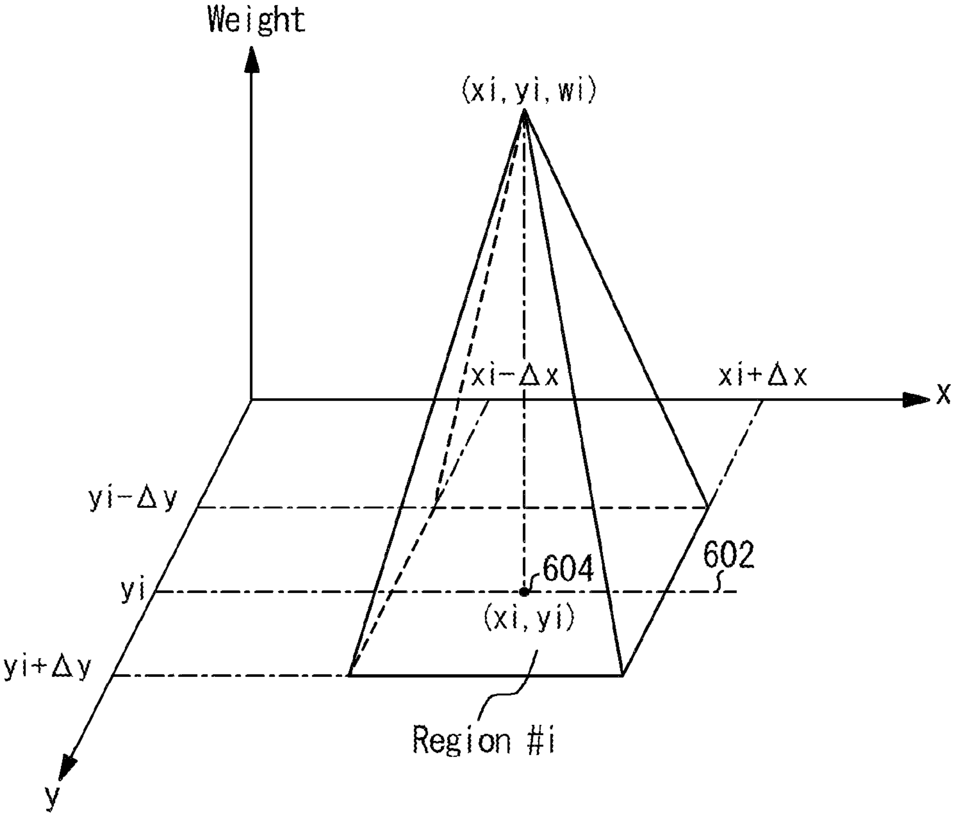
FIG. 6 is a three-dimension graph showing example weights assigned to pixels, according to one or more embodiments.

FIG. 6 is a three-dimensional graph showing example weights assigned to pixels selected for the calculation of the weighted APL for light source #i located at coordinates ($x_i$, $y_i$) (e.g., one of the light sources 410 shown in FIGS. 3 and 4), according to one or more embodiments. It is noted that, as shown in FIG. 3, the x axis is defined in the horizontal direction of the display panel 200 and the y axis is defined in the vertical direction of the display panel 200. The weights for light source #i may be described in the corresponding light intensity distribution filter 320 shown in FIG. 5.

In the embodiment shown in FIG. 6, the weighted APL for light source #i is a weighted average of brightness values for pixels located in region #i with x coordinates between $x_i-\Delta x$ and $x_i+\Delta x$ and y coordinates between $y_i-\Delta y$ and $y_i+\Delta y$. Non-zero weights are assigned to the pixels located in region #i while weights assigned to other pixels (that is, pixels located outside of region #i) are zero. In some embodiments, $\Delta x$ is equal to $\Delta y$ and region #i is square. In other embodiments, $\Delta x$ and $\Delta y$ may be different from each other. In the shown embodiment, the weight assigned to the pixel located at ($x_i$, $y_i$) is $w_i$, which is typically 1.0. In one or more embodiments, the non-zero weights assigned to the pixels in region #i increase with decrease in the respective distances between the pixels and coordinates ($x_i$, $y_i$), that is, the respective distances between the pixels and light source #i. In the shown embodiment, the weights assigned to pixels in region #i may be defined as coordinates on the side faces of a four-sided pyramid which has the apex at coordinates ($x_i$, $y_i$, $w_i$).

Figure 7:
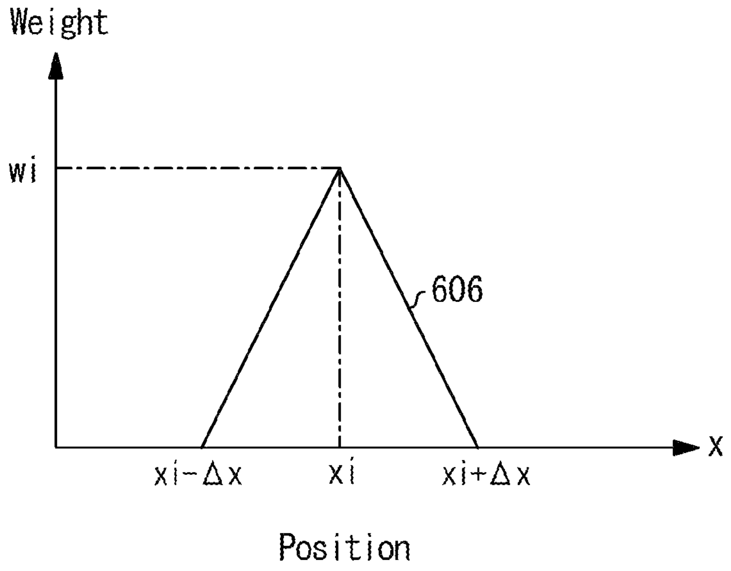
FIG. 7 is a graph showing example weights assigned to pixels arrayed on a line shown in FIG. 6, according to one or more embodiments.

FIG. 7 is a graph showing example weights assigned to pixels arrayed on a line 602 shown in FIG. 6, according to one or more embodiments, where the line 602 extends in the x-axis direction (corresponding to the horizontal direction of the display panel 200), passing the projection 604 of the location of light source #i on the display panel 200 as shown in FIG. 6. It is noted that all the pixels on the line 602 have y coordinates of $y_i$. The trendline 606 indicates the weights assigned to the pixels arrayed on the line 602. The weights assigned to the pixels arrayed on the line 602 increase towards the x coordinate of $x_i$, which is the x coordinate of light source #i. Accordingly, the weights assigned to the pixels arrayed on the line 602 increase with decrease in the respective distances between light source #i and the pixels. While FIG. 7 shows that the weights assigned to the pixels arrayed on the line 602 linearly increase towards the x coordinate of $x_i$ (that is, the position of light source #i), the weights may non-linearly increase towards the x coordinate of $x_i$.

Figure 8A:
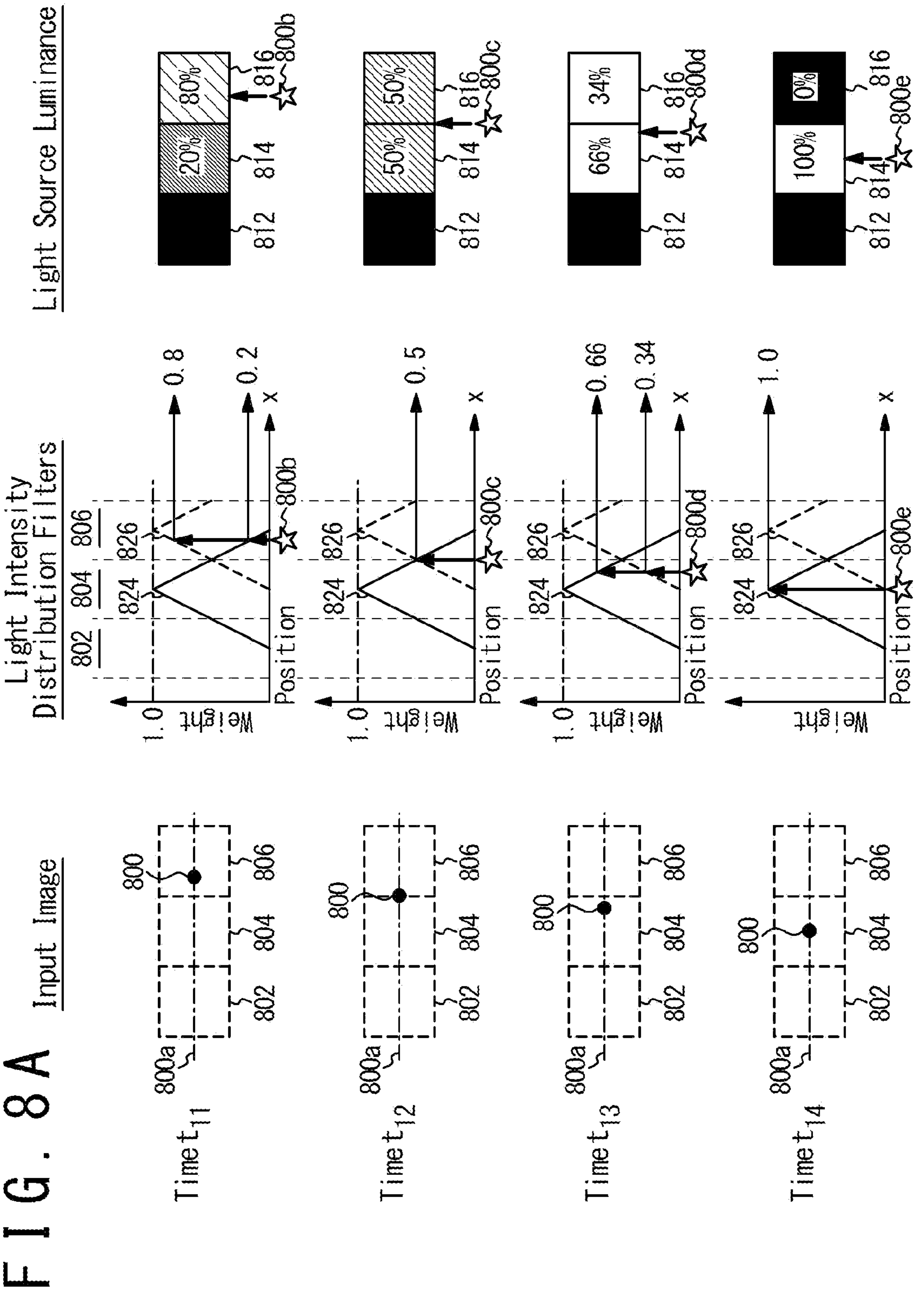
FIG. 8A shows example luminance control of light sources, according to one or more embodiments.

FIG. 8A shows example luminance control of light sources, according to one or more embodiments. The shown example luminance control is for the case where, as shown in the left column of FIG. 8A, a moving image is displayed in which an object 800 with the maximum luminance (shown as a black solid circle in FIG. 8A) moves in the background image of the lowest luminance (shown as white in FIG. 8A) along a straight trajectory 800*a* that crosses square regions 802, 804, and 806 of the display panel (e.g., the display panel 200 shown in FIGS. 3 and 4). The top display panel and graph of FIG. 8A are at time $t_{11}$, the second top display panel and graph are at time $t_{12}$ that follows time $t_{11}$, the second bottom display panel and graph are at time $t_{13}$ that follows time $t_{12}$, and the bottom display panel and graph are at time $t_{14}$ that follows time $t_{13}$.

Figure 8B:
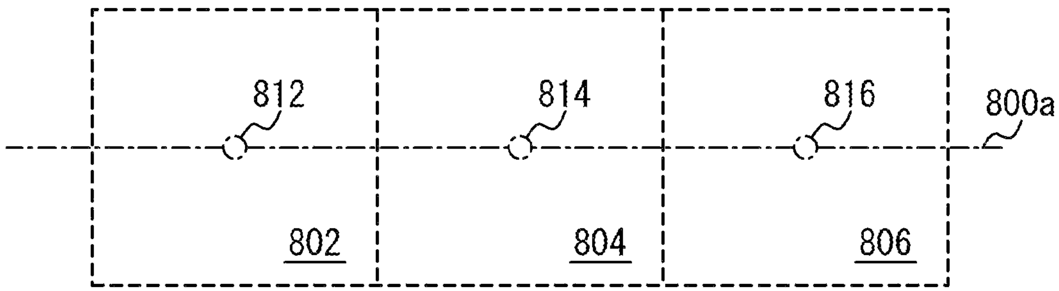
FIG. 8B shows an example arrangement of light sources, according to one or more embodiments.

FIG. 8B shows an example arrangement of light sources 812, 814, and 816 (which may be one embodiment of the light sources 410 shown in FIGS. 3 and 4) with respect to the regions 802, 804, and 806 shown in FIG. 8A, according to one or more embodiments. In the shown embodiment, the light sources 812, 814, and 816 are disposed behind the regions 802, 804, and 806 of the display panel such that the projections of the light sources 812, 814, and 816 onto the display panel are located at the centers of the regions 802, 804, and 806, respectively. The light source 812 is configured to illuminate the region 802 and the area around the region 802, the light source 814 is configured to illuminate the region 804 and the area around the region 804, and the light source 816 is configured to illuminate the region 806 and the area around the region 806. The trajectory 800*a* of the object 800 is determined to pass the projections of the light sources 812, 814, and 816 onto the display panel.

Referring back to FIG. 8A, the middle column in FIG. 8A shows example weights assigned to pixels arrayed along the trajectory 800*a* for the calculations of the weighted APLs for the light sources 814 and 816, according to one or more embodiments. The weights used for the calculations of the weighted APLs for the light sources 814 and 816 may be stored in the form of light intensity distribution filters for the light sources 814 and 816, respectively.

The trendline 824 indicates weights assigned to pixels arrayed along the trajectory 800*a* for the calculation of the weighted APL for the light source 814. In the shown embodiment, the weights assigned to the pixels arrayed along the trajectory 800*a* for the calculation of the weighted APL of the light source 814 increase towards the light source 814 and the weight assigned to the pixel closest to the light source 814 takes the maximum weight of 1.0. The weighted APL for the light source 814 is calculated based on a weighted average of the brightness values of the pixels arrayed along the trajectory 800*a*, and the luminance of the light source 814 is controlled based on the weighted APL calculated for the light source 814.

Correspondingly, the trendline 826 indicates weights assigned to pixels arrayed along the trajectory 800*a* for the calculation of the weighted APL for the light source 816. The weights assigned to the pixels arrayed along the trajectory 800*a* for the calculation of the weighted APL of the light source 816 increase towards the light source 816 and the weight assigned to the pixel closest to the light source 816 takes the maximum weight of 1.0. The weighted APL for the light source 816 is calculated based on a weighted average of the brightness values of the pixels arrayed along the trajectory 800*a*, and the luminance of the light source 816 is controlled based on the weighted APL calculated for the light source 816.

In one embodiment, the weights assigned to the respective pixels are determined to reduce flicker of the displayed image potentially caused by changes in the total luminance. In the shown embodiment, the sum of the weights assigned to each pixel for the calculations of the weighted APLs for the light sources 814 and 816 is kept constant over the pixels arrayed along the trajectory 800*a*. It is noted that the pixels arrayed along the trajectory 800*a* include pixels used for the calculations of the weighted APLs for the light sources 814 and 816. In the shown embodiment, the sum of the weights assigned to each pixel is kept constant to 1.0.

For example, as shown in the topmost graph of the middle column, the pixel at a position 800*b* (indicated by a star in FIG. 8A) in the region 806 is assigned with a weight of 0.2 for the calculation of the weighted APL for the light source 814, while assigned with a weight of 0.8 for the calculation of the weighted APL for the light source 816. Further, as shown in the second graph from the top, the pixel at a position 800*c* at the boundary between the regions 804 and 806 is assigned with a weight of 0.5 for both the calculations of the weighted APLs for the light sources 814 and 816. Further, as shown in the second graph from the bottom, the pixel at a position 800*d* in the region 804 is assigned with a weight of 0.66 for the calculation of the weighted APL for the light source 814, while assigned with a weight of 0.34 for the calculation of the weighted APL for the light source 816. Finally, as shown in the bottommost graph, the pixel at a position 800*e* closest to the light source 814 in the region 804 is assigned with a weight of 1.0 for the calculation of the weighted APL for the light source 814, while assigned with a weight of 0 for the calculation of the weighted APL for the light source 816.

The shown assignment of the weights to the respective pixels effectively reduces changes in the total luminance, mitigating or eliminating occurrence of flicker. In the shown example, when the object 800 is positioned at the position 800*b* at time $t_{21}$, as shown in the topmost figure of the right column of FIG. 8A, the light source 814 emits light with a luminance of 20% and the light source 816 emits light with a luminance of 80%. When the object 800 is positioned at the position 800*c* at time $t_{22}$, as shown in the second figure from the top, the light sources 814 and 816 both emit light with a luminance of 50%. When the object 800 is positioned at the position 800*d* at time $t_{23}$, as shown in the second figure from the bottom, the light source 814 emits light with a luminance of 66% and the light source 816 emits light with a luminance of 34%. When the object 800 is positioned at the position 800*e* at time $t_{24}$, as shown in the bottommost figure, the light source 814 emits light with a luminance 100% and the light source 816 emits light with a luminance 0%. As such, the total luminance of the light sources 814 and 816 is kept constant to 100%.

Figure 9A:
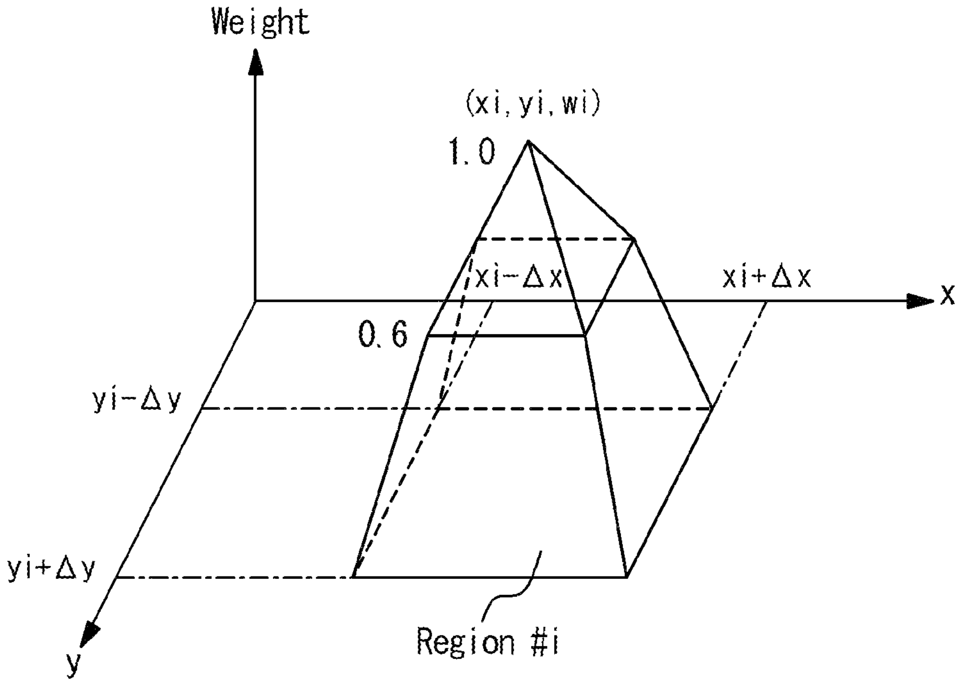
FIG. 9A is a three-dimension graph showing example weights assigned to pixels, according to one or more embodiments.
Figure 9B:
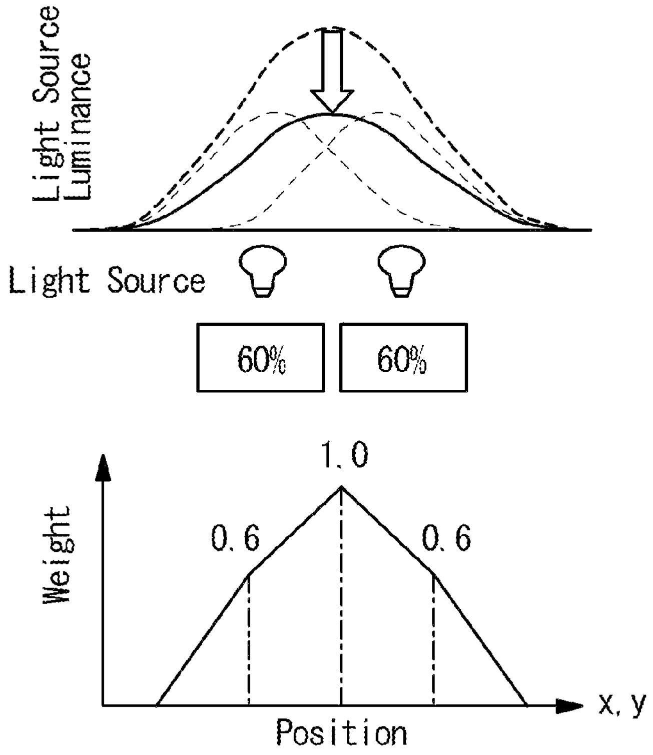
FIG. 9B shows example luminance control of light sources, according to one or more embodiments.

FIG. 9A is a three-dimensional graph showing another example of weight assignment to pixels selected for the calculation of the weighted APL for light source #i located at coordinates ($x_i$, $y_i$) (e.g., one of the light sources 410 shown in FIGS. 3 and 4), according to one or more embodiments. The weights assigned to pixels for the calculation of the weighted APL for a light source may be based on the light intensity distribution of the light source. FIG. 9A shows the case where the light intensity distribution of light source #i is wider compared to the case of FIG. 6. In the example shown in FIG. 9A, the weights assigned to pixels increase with a first gradient from 0.0 to 0.6 and increase with a second gradient less than the first gradient from 0.6 to 1.0. When an object with the maximum brightness value is positioned at the middle of adjacent two light sources, as shown in the top figure of FIG. 9B, the two light sources may emit light with a luminance of 60%.

Figure 9C:
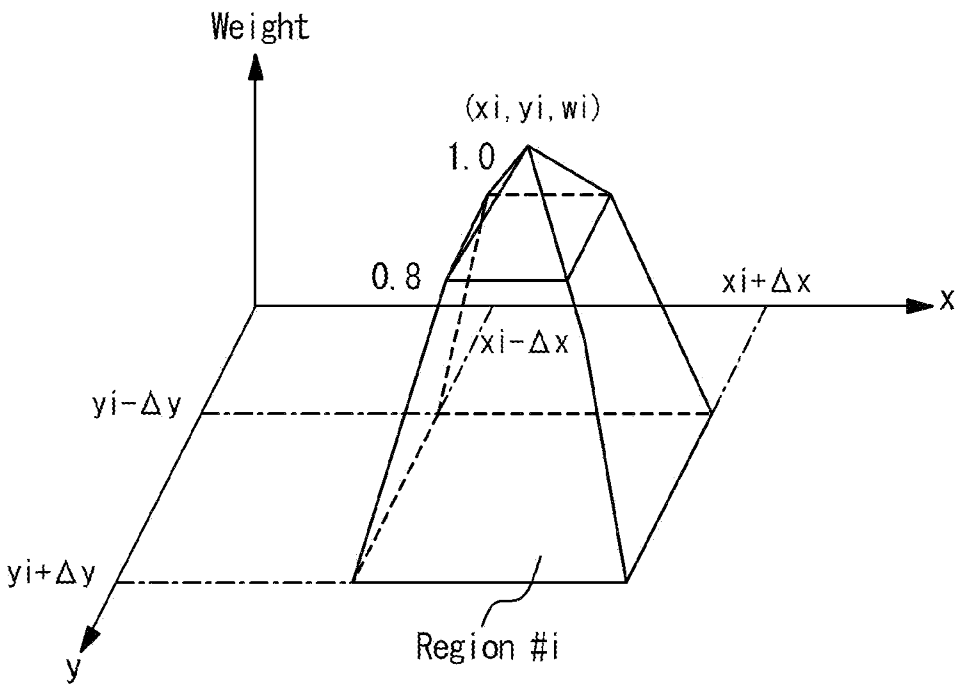
FIG. 9C is a three-dimension graph showing example weights assigned to pixels, according to one or more embodiments.
Figure 9D:
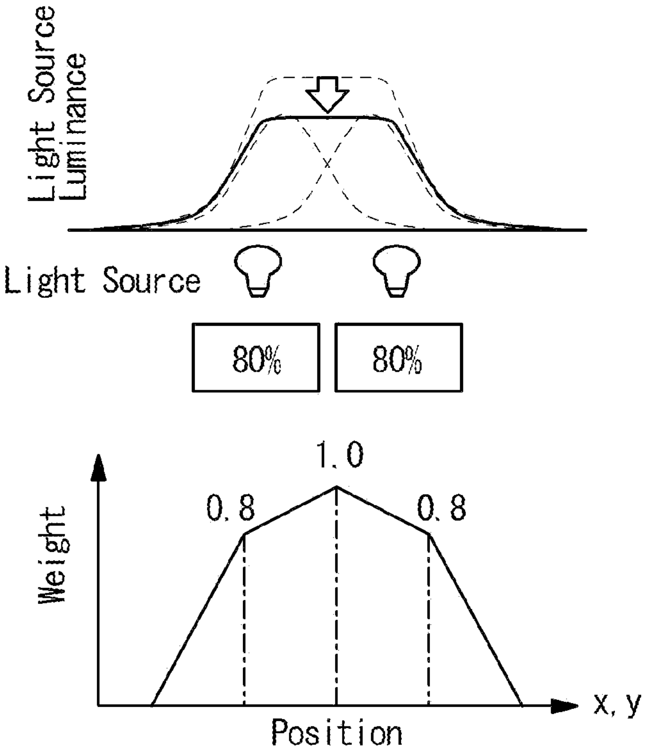
FIG. 9D shows example luminance control of light sources, according to one or more embodiments.

FIG. 9C is a three-dimensional graph showing still another example of weight assignment to pixels selected for the calculation of the weighted APL for light source #i located at coordinates ($x_i$, $y_i$) (e.g., one of the light sources 410 shown in FIGS. 3 and 4), according to one or more embodiments. FIG. 9C shows the case where the light intensity distribution of light source #i is wider compared to the case of FIG. 9A. In the example shown in FIG. 9C, the weights assigned to pixels increase with a first gradient from 0.0 to 0.8 and increase with a second gradient less than the first gradient from 0.8 to 1.0. When an object with the maximum brightness value is positioned at the middle of adjacent two light sources, as shown in the top figure of FIG. 9D, the two light sources may emit light with a luminance of 80%.

Figure 10:
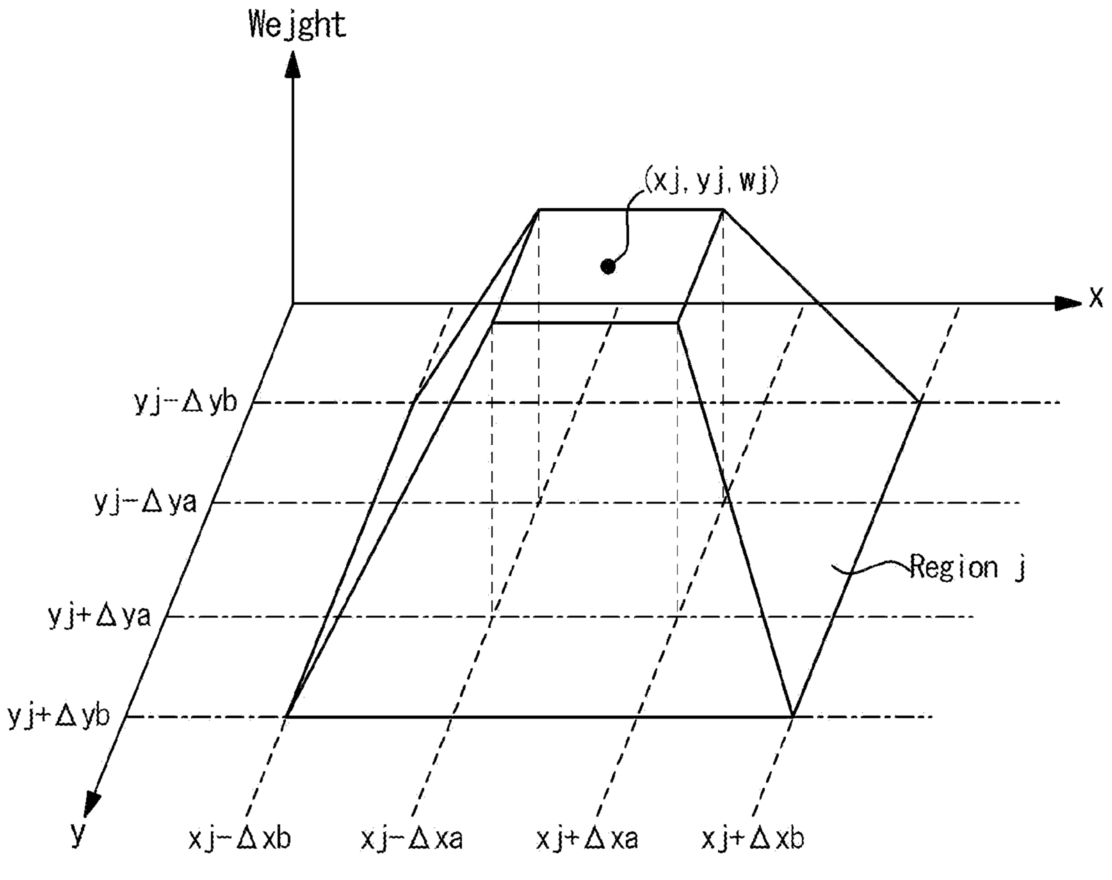
FIG. 10 is a three-dimension graph showing example weights assigned to pixels, according to one or more embodiments.

FIG. 10 is a three-dimensional graph showing still another example of weights assigned to pixels selected for the calculation of the weighted APL for light source #j located at coordinates ($x_j$, $y_j$) (e.g., one of the light sources 410 shown in FIGS. 3 and 4) according to one or more embodiments. FIG. 10 shows the case where the light intensity distribution of light source #j is wider compared to the case of FIG. 9C. The weights for light source #j may be described in the corresponding light intensity distribution filter 320 shown in FIG. 5.

In the embodiment shown in FIG. 10, the weighted APL for light source #j is a weighted average of brightness values for pixels located in region #j, which is the region with x coordinates between $x_j-\Delta x_b$ and $x_j+\Delta x_b$ and y coordinates between $y_j-\Delta y_b$ and $y_j+\Delta y_b$. Non-zero weights are assigned to the pixels located in region #j while weights assigned to other pixels (that is, pixels located outside of region #j) are zero. In the shown embodiment, the weights assigned to pixels with x coordinates between $x_j-\Delta x_a$ and $x_j+\Delta x_a$ and y coordinates between $y_j-\Delta y_a$ and $y_j+\Delta y_a$ are $w_j$, which is typically 1.0, where $\Delta x_a<\Delta x_b$ and $\Delta y_a<\Delta y_b$. In one or more embodiments, the weights assigned to the pixels in region #j outsides of the region with the x coordinates between $x_j-\Delta x_a$ and $x_j+\Delta x_a$ and the y coordinates between $y_j-\Delta y_a$ and $y_j+\Delta y_a$ increase with decrease in the respective distances between the pixels and coordinates ($x_j$, $y_j$), that is, the respective distances between the pixels and light source #j. In the shown embodiment, the weights assigned to pixels in region #j may be defined as coordinates on the top face and the four side faces of a pyramid frustum.

Figure 11A:
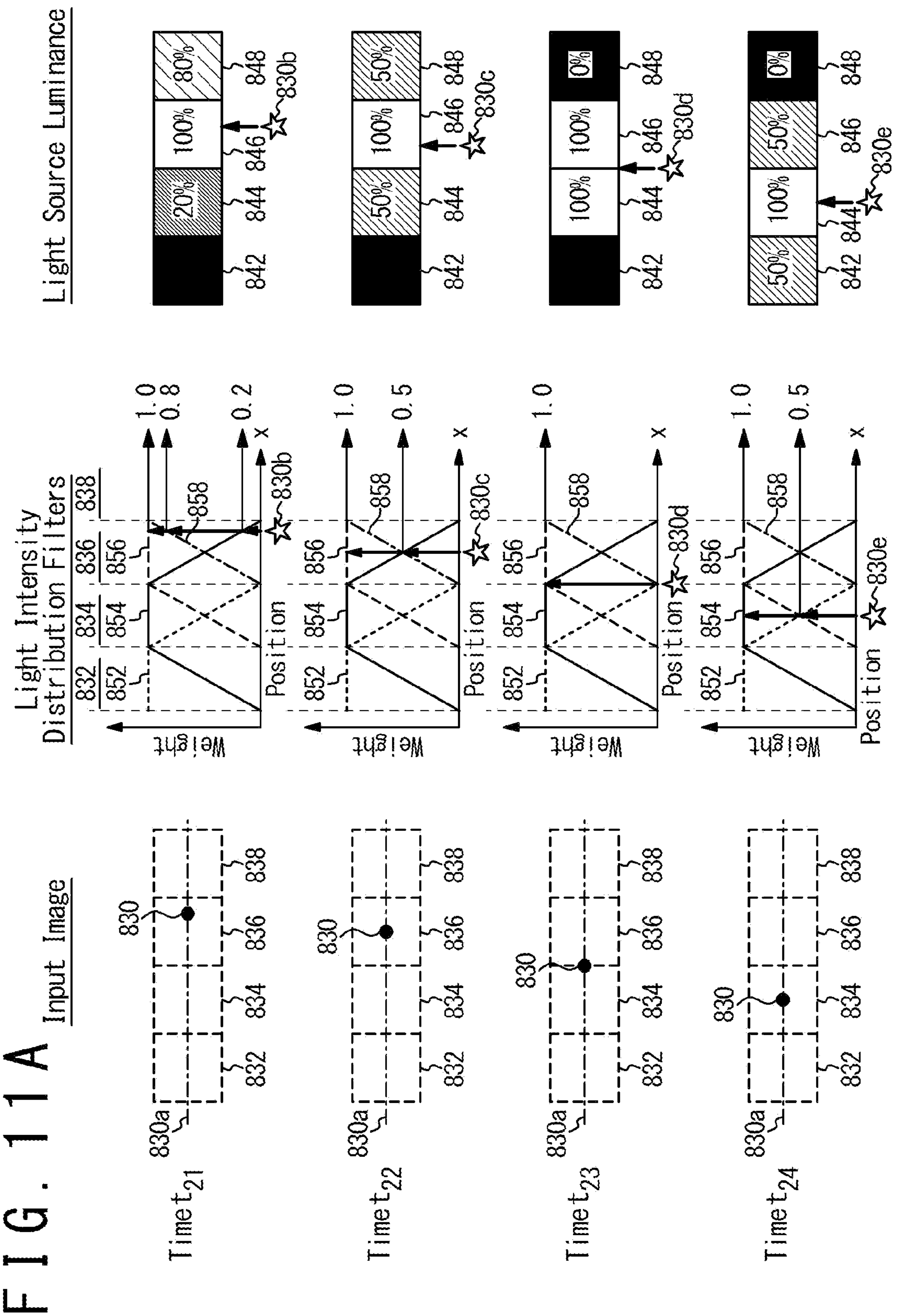
FIG. 11A shows example luminance control of light sources, according to one or more embodiments.

FIG. 11A shows example luminance control of light sources, according to one or more embodiments. The shown example luminance control is for the case where, as shown in the left column of FIG. 11A, a moving image is displayed in which an object 830 with the maximum luminance (shown as a black solid circle in FIG. 11A) moves in the background image of the lowest luminance (shown as white in FIG. 11A) along a straight trajectory 830*a* that crosses square regions 832, 834, 836, and 838 of the display panel (e.g., the display panel 200 shown in FIGS. 3 and 4). The top display panel and graph of FIG. 11A are at time $t_{21}$, the second top display panel and graph are at time $t_{22}$ that follows time $t_{21}$, the second bottom display panel and graph are at time $t_{23}$ that follows time $t_{22}$, and the bottom display panel and graph are at time $t_{24}$ that follows time $t_{23}$.

Figure 11B:
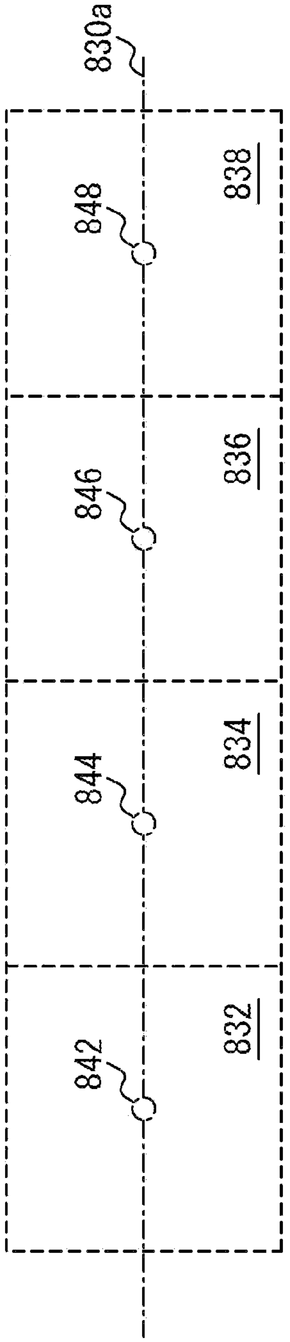
FIG. 11B shows an example arrangement of light sources, according to one or more embodiments.

FIG. 11B shows an example arrangement of light sources 842, 844, 846 and 848 (which may be one embodiment of the light sources 410 shown in FIGS. 3 and 4) with respect to the regions 832, 834, 836, and 838 shown in FIG. 11A, according to one or more embodiments. In the shown embodiment, the light sources 842, 844, 846 and 848 are disposed behind the regions 832, 834, 836, and 838 of the display panel such that the projections of the light sources 842, 844, 846, and 848 onto the display panel are located at the centers of the regions 832, 834, 836, and 838, respectively. The light source 842 is configured to illuminate the region 832 and the area around the region 832, the light source 844 is configured to illuminate the region 834 and the area around the region 834, the light source 846 is configured to illuminate the region 836 and the area around the region 836, and the light source 848 is configured to illuminate the region 838 and the area around the region 838. The trajectory 830*a* of the object 830 is determined to pass the projections of the light sources 842, 844, 846, and 848 onto the display panel.

Referring back to FIG. 11A, the middle column of FIG. 11A shows example weights assigned to pixels arrayed along the trajectory 830*a* for the calculations of the weighted APLs for the light sources 842, 844, 846, and 848, according to one or more embodiments. The weights used for the calculations of the weighted APLs for the light sources 842, 844, 846, and 848 may be stored in the form of light intensity distribution filters for the light sources 842, 844, 846, and 848, respectively.

In FIG. 11A, the trendline 852 indicates weights assigned to pixels arrayed along the trajectory 830*a* for the calculation of the weighted APL for the light source 842. In the shown embodiment, the weights assigned to the pixels located in the region 832 along the trajectory 830*a* for the calculation of the weighted APL of the light source 842 are the maximum weight of 1.0, and the weights assigned to the pixels arrayed along the trajectory 830*a* in the region 834 increase towards the region 832. The weighted APL for the light source 842 is calculated based on a weighted average of the brightness values of the pixels arrayed along the trajectory 830*a*, and the luminance of the light source 842 is controlled based on the weighted APL calculated for the light source 842.

The trendline 854 indicates weights assigned to pixels arrayed along the trajectory 830*a* for the calculation of the weighted APL for the light source 844. In the shown embodiment, the weights assigned to the pixels located in the region 834 along the trajectory 830*a* for the calculation of the weighted APL of the light source 844 are the maximum weight of 1.0, and the weights assigned to the pixels arrayed in the regions 832 and 836 along the trajectory 830*a* increase towards the region 834. The weighted APL for the light source 844 is calculated based on a weighted average of the brightness values of the pixels arrayed along the trajectory 830*a*, and the luminance of the light source 844 is controlled based on the weighted APL calculated for the light source 844.

The trendline 856 indicates weights assigned to pixels arrayed along the trajectory 830*a* for the calculation of the weighted APL for the light source 846. In the shown embodiment, the weights assigned to the pixels located in the region 836 along the trajectory 830*a* for the calculation of the weighted APL of the light source 846 are the maximum weight of 1.0, and the weights assigned to the pixels arrayed in the regions 834 and 838 along the trajectory 830*a* increase towards the region 836. The weighted APL for the light source 846 is calculated based on a weighted average of the brightness values of the pixels arrayed along the trajectory 830*a*, and the luminance of the light source 846 is controlled based on the weighted APL calculated for the light source 846.

The trendline 858 indicates weights assigned to pixels arrayed along the trajectory 830*a* for the calculation of the weighted APL for the light source 848. In the shown embodiment, the weights assigned to the pixels located in the region 838 along the trajectory 830*a* for the calculation of the weighted APL of the light source 848 are the maximum weight of 1.0, and the weights assigned to the pixels arrayed in the region 836 along the trajectory 830*a* increase towards the region 838. The weighted APL for the light source 848 is calculated based on a weighted average of the brightness values of the pixels arrayed along the trajectory 830*a*, and the luminance of the light source 848 is controlled based on the weighted APL calculated for the light source 848.

In one embodiment, the weights assigned to the respective pixels are determined to reduce flicker of the displayed image potentially caused by changes in the total luminance. In the shown embodiment, the sum of the weights assigned to each pixel for the calculations of the weighted APLs for the light sources 842, 844, 846, and 848 is kept constant over the pixels arrayed along the trajectory 830*a*. In the shown embodiment, the sum of the weights assigned to each pixel is kept constant to 2.0. For example, as shown in the topmost graph of the middle column, the pixel at a position 830*b* in the right part of the region 836 is assigned with a weight of 1.0 for the calculation of the weighted APL for the light source 846, with a weight of 0.2 for the calculation of the weighted APL for the light source 844, and with a weight of 0.8 for the calculation of the weighted APL for the light source 848. As shown in the second graph from the top, the pixel at a position 830*c* closest to the light source 846 in the region 836 is assigned with a weight of 1.0 for the calculation of the weighted APL for the light source 846 and with a weight of 0.5 for the calculations of the weighted APLs for the light sources 844 and 848. Further, as shown in the second graph from the bottom, the pixel at a position 830*d* at the boundary between the regions 834 and 836 is assigned with a weight of 1.0 for both the calculations of the weighted APLs for the light sources 844 and 846. Finally, as shown in the bottommost graph, the pixel at a position 830*e* closest to the light source 844 in the region 834 is assigned with a weight of 1.0 for the calculation of the weighted APL for the light source 844 and with a weight of 0.5 for the calculations of the weighted APLs for the light sources 842 and 846.

The shown assignment of the weights to the respective pixels effectively reduces changes in the total luminance, mitigating or eliminating occurrence of flicker. In the shown example, when the object 830 is positioned at the position 830*b* at time $t_{21}$, as shown in the topmost figure of the right column of FIG. 11A, the light source 844 emits light with a luminance of 20%, and the light source 846 emits light with a luminance of 100%, and the light source 848 emits light with a luminance of 80%. When the object 830 is positioned at the position 830*c* at time $t_{22}$, as shown in the second figure from the top, the light source 844 emits light with a luminance of 50%, and the light source 846 emits light with the luminance of 100%, and the light source 848 emits light with a luminance of 50%. When the object 830 is positioned at the position 830*d* at time $t_{23}$, as shown in the second figure from the bottom, the light sources 844 and 846 emit light with the luminance of 100%. When the object 830 is positioned at the position 830*e* at time $t_{24}$, as shown in the bottommost figure, the light source 842 emits light with the luminance of 50%, the light source 844 emits light with the luminance of 100%, and the light source 846 emits light with the luminance of 50%. As such, the total luminance of the light sources 842, 844, 846, and 848 is kept constant to 200%.

The total luminance of the light sources 842, 844, 846, and 848 may be controlled with the sum of the weights assigned to each pixel. In the embodiment shown in FIG. 11A, the sum of the weights assigned to each pixel is increased up to 2.0 to achieve an increased total luminance compared with the embodiment shown in FIG. 8A, in which the sum of the weights assigned to each pixel is 1.0.

Figure 12:
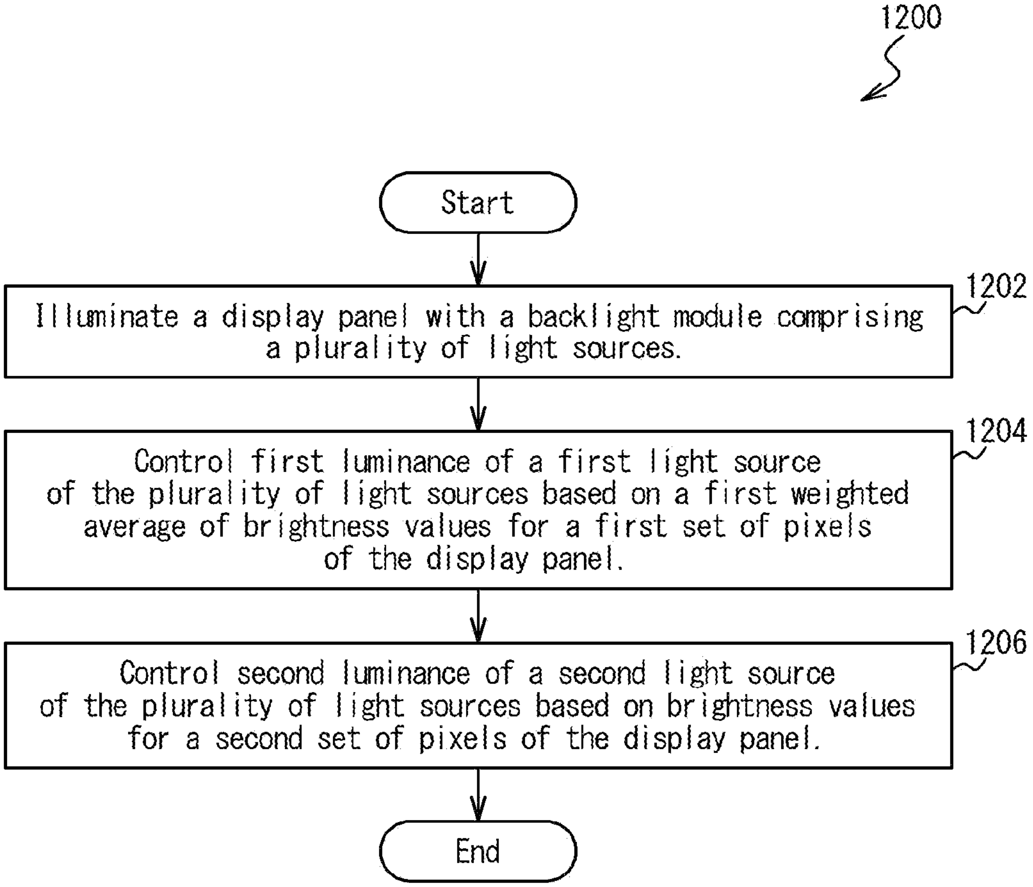
FIG. 12 shows a flowchart depicting an example method for controlling light sources of a backlight module, according to one or more embodiments.

FIG. 12 shows a flowchart depicting an example method 1200 for controlling light sources of a backlight module, according to one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 12.

The method includes illuminating a display panel (e.g., the display panel 200 shown in FIGS. 3 and 4) with a backlight module (e.g., the backlight module 400 shown in FIGS. 3 and 4) comprising a plurality of light sources (e.g., the light sources 410 shown in FIGS. 3 and 4) in step 1202. Examples of the light sources include LEDs and other directive light sources.

The method further includes controlling first luminance of a first light source of the plurality of light sources based at least in part on a first weighted average of brightness values for a first set of pixels of the display panel in step 1204. The first weighted average may be based at least in part on weights respectively assigned to the first set of pixels depending on respective distances between the first light source and the corresponding ones of the first set of pixels. In one implementation, the weights assigned to the first set of pixels may increase with decrease in the respective distances between the first light source and the corresponding ones of the first set of pixels (for example, as shown in FIGS. 6, 9A and 9C).

The method further includes control second luminance of a second light source of the plurality of light sources based at least in part on brightness values for a second set of pixels of the display panel in step 1206. In one or more embodiments, at least one pixel of the display panel belongs to both the first set and the second set. The control of the second luminance of the second light source may be based at least in part on a second weighted average of the brightness values for the second set of pixels. The second weighted average is based at least in part on weights respectively assigned to the second set of pixels depending on respective distances between the second light source and the corresponding ones of the second set of pixels.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display device, comprising:

a display panel;

a backlight module configured to illuminate the display panel, the backlight module comprising a plurality of light sources; and backlight control circuitry configured to:

control first luminance of a first light source of the plurality of light sources based at least in part on a first weighted average of brightness values for a first set of pixels of the display panel; and control second luminance of a second light source of the plurality of light sources based at least in part on brightness values for a second set of pixels of the display panel, wherein at least one pixel of the display panel belongs to both the first set and the second set.

2. The display device of claim 1, wherein the first weighted average is based at least in part on:

a first weight assigned to a first pixel of the first set of pixels; and a second weight assigned to a second pixel of the first set of pixels, wherein a distance between the first pixel and the first light source is greater than a distance between the second pixel and the first light source, and wherein the first weight is less than the second weight.

3. The display device of claim 1, wherein the first weighted average is based at least in part on weights respectively assigned to the first set of pixels depending on respective distances between the first light source and the corresponding ones of the first set of pixels.

4. The display device of claim 3, wherein the weights assigned to the first set of pixels increase with decrease in the distances between the first light source and the corresponding ones of the first set of pixels.

5. The display device of claim 3, wherein the weights assigned to the first set of pixels are based at least in part on a light intensity distribution of the first light source.

6. The display device of claim 1, wherein controlling the second luminance of the second light source is based at least in part on a second weighted average of the brightness values for the second set of pixels.

7. The display device of claim 6, wherein the first weighted average is based at least in part on weights respectively assigned to the first set of pixels depending on respective distances between the first light source and the corresponding ones of the first set of pixels, and wherein the second weighted average is based at least in part on weights respectively assigned to the second set of pixels depending on respective distances between the second light source and the corresponding ones of the second set of pixels.

8. The display device of claim 1, further comprising image analysis circuitry configured to apply a first filter to image data to calculate the first weighted average of the brightness values for the first set of pixels, the image data corresponding to an image displayed on the display panel.

9. The display device of claim 8, wherein the first filter is based at least in part on a light intensity distribution of the first light source.

10. The display device of claim 8, wherein the image analysis circuitry is further configured to apply a second filter to the image data to calculate a second weighted average of the brightness values for a second set of pixels of the display panel, the second filter being based at least in part on a light intensity distribution of a second light source of the plurality of light sources, wherein the backlight control circuitry is further configured to control second luminance of a second light source of the plurality of light sources based at least in part on the second weighted average.

11. A display driver, comprising:

drive circuitry configured to drive, based at least in part on image data, a display panel illuminated by a backlight module comprising a plurality of light sources; and backlight control circuitry configured to:

control first luminance of a first light source of the plurality of light sources based at least in part on a first weighted average of brightness values for a first set of pixels of the display panel; and control second luminance of a second light source of the plurality of light sources based at least in part on brightness values for a second set of pixels of the display panel, wherein at least one pixel of the display panel belongs to both the first set and the second set.

12. The display driver of claim 11, wherein the first weighted average is based at least in part on:

a first weight assigned to a first pixel of the first set of pixels; and a second weight assigned to a second pixel of the first set of pixels, wherein a distance between the first pixel and the first light source is greater than a distance between the second pixel and the first light source, and wherein the first weight is less than the second weight.

13. The display driver of claim 11, wherein the first weighted average is based at least in part on weights respectively assigned to the first set of pixels depending on respective distances between the first light source and the corresponding ones of the first set of pixels.

14. The display driver of claim 13, wherein the weights assigned to the first set of pixels increase with decrease in the distances between the first light source and the corresponding ones of the first set of pixels.

15. The display driver of claim 11, wherein controlling the second luminance of the second light source is based at least in part on a second weighted average of the brightness values for the second set of pixels.

16. A method, comprising:

illuminating a display panel with a backlight comprising a plurality of light sources;

controlling first luminance of a first light source of the plurality of light sources based at least in part on a first weighted average of brightness values for a first set of pixels of the display panel; and controlling second luminance of a second light source of the plurality of light sources based at least in part on brightness values for a second set of pixels of the display panel, wherein at least one pixel of the display panel belongs to both the first set and the second set.

17. The method of claim 16, wherein the first weighted average is based at least in part on weights respectively assigned to the first set of pixels depending on respective distances between the first light source and the corresponding ones of the first set of pixels.

18. The method of claim 17, wherein the weights assigned to the first set of pixels increase with decrease in the distances between the first light source and the corresponding ones of the first set of pixels.

* * * * *